United States Patent
Robitaille et al.

(10) Patent No.: US 10,305,737 B2
(45) Date of Patent: *May 28, 2019

(54) SYSTEM FOR TESTING ETHERNET PATHS AND LINKS WITHOUT IMPACTING NON-TEST TRAFFIC

(71) Applicant: Accedian Networks Inc., Saint-Laurent (CA)

(72) Inventors: Claude Robitaille, St-Placide (CA); Steve Rochon, Brossard (CA)

(73) Assignee: Accedian Networks Inc., St-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,773

(22) Filed: Jul. 17, 2017

(65) Prior Publication Data

US 2017/0317880 A1    Nov. 2, 2017

Related U.S. Application Data

(63) Continuation of application No. 14/446,708, filed on Jul. 30, 2014, now Pat. No. 9,742,579, which is a
(Continued)

(51) Int. Cl.
*H04L 12/24*    (2006.01)
*H04L 12/26*    (2006.01)

(52) U.S. Cl.
CPC ............ *H04L 41/085* (2013.01); *H04L 43/50* (2013.01)

(58) Field of Classification Search
CPC ...... H04J 2203/0085; H04J 2203/0062; H04L 12/2881; H04L 45/66; H04L 49/351;
(Continued)

(56) References Cited

U.S. PATENT DOCUMENTS 5,937,165 A * 8/1999 Schwaller ............... H04L 43/50
709/224
6,052,362 A    4/2000 Somer
(Continued)

FOREIGN PATENT DOCUMENTS

EP    1 424 809    6/2004
EP    2 198 557 B1    4/2014
(Continued)

OTHER PUBLICATIONS

International Search Report corresponding to co-pending International Patent Application Serial No. PCT/IB2008/002365, dated Jan. 7, 2009, 4 pages.
(Continued)

*Primary Examiner* — Jung Liu
(74) *Attorney, Agent, or Firm* — Stratford Managers Corporation

(57)    ABSTRACT

A system for testing Ethernet paths or links without adversely impacting non-test traffic. The system includes a test traffic generator that includes a scheduler that determines when a new test packet is generated. The test traffic generator includes a packet creator that builds a test packet and a transmitter for transmitting the test packet via the Ethernet path or link. The packet creator sends the test packet to the transmitter. The traffic generator includes a transmit credit block coupled to the transmitter or to the scheduler. The transmit credit block stores an amount of credits representing a number of bytes that are available to transmit and decrements the amount each time a non-test packet is communicated via the Ethernet path or link.

8 Claims, 2 Drawing Sheets

Related U.S. Application Data continuation of application No. 13/293,199, filed on Nov. 10, 2011, now Pat. No. 8,824,312, which is a continuation of application No. 12/209,345, filed on Sep. 12, 2008, now Pat. No. 8,139,494.

(60) Provisional application No. 60/993,622, filed on Sep. 13, 2007.

(58) Field of Classification Search
CPC .............. H04L 49/352; H04L 49/604; H04L 2012/445; H04L 2012/6454; H04L 43/50; H04L 1/242; H04L 1/244; H04L 12/26; H04L 12/2697; H04Q 11/0067; H04Q 11/045; H04Q 1/20
See application file for complete search history.

(56) References Cited

U.S. PATENT DOCUMENTS

| | | | |
|---|---|---|---|
| 6,075,773 | A | 6/2000 | Clark et al. |
| 6,085,248 | A | 7/2000 | Sambamurthy et al. |
| 6,625,764 | B1 | 9/2003 | Dawson |
| 6,950,963 | B1* | 9/2005 | Parson ............ G01R 31/31854 714/30 |
| 7,020,807 | B2 | 3/2006 | Ehmann et al. |
| 7,194,661 | B1* | 3/2007 | Payson ............... H04L 12/2697 370/242 |
| 7,313,144 | B2 | 12/2007 | Kobayashi et al. |
| 7,765,290 | B2* | 7/2010 | Hua ........................ H04L 45/00 709/223 |
| 7,792,115 | B2* | 9/2010 | Dropps ................ H04L 69/324 370/392 |
| 7,826,470 | B1* | 11/2010 | Aloni ................... H04L 49/9063 370/419 |
| 2002/0080723 | A1 | 6/2002 | Hoch et al. |
| 2003/0092394 | A1 | 5/2003 | Gray et al. |
| 2004/0015616 | A1 | 1/2004 | Chen |
| 2004/0071084 | A1 | 4/2004 | El-Hennawey et al. |
| 2004/0208129 | A1* | 10/2004 | Old ........................ H04J 3/1617 370/241 |
| 2004/0230881 | A1* | 11/2004 | Gwak ................ H04N 17/004 714/728 |
| 2005/0281392 | A1 | 12/2005 | Weeks et al. |
| 2006/0045121 | A1 | 3/2006 | Monk |
| 2007/0047448 | A1 | 3/2007 | Chiu et al. |
| 2007/0121504 | A1* | 5/2007 | Hellenthal .............. H04L 47/10 370/230 |
| 2007/0177517 | A1 | 8/2007 | Manabe |
| 2008/0117810 | A1* | 5/2008 | Stott ....................... H04L 12/66 370/230 |
| 2008/0195901 | A1* | 8/2008 | Solt ......................... G11C 29/16 714/718 |
| 2008/0225733 | A1* | 9/2008 | Hua ........................ H04L 45/00 370/242 |
| 2009/0207850 | A1 | 8/2009 | Osano et al. |

FOREIGN PATENT DOCUMENTS

| | | |
|---|---|---|
| JP | 2000/354046 | 12/2000 |
| JP | 2002/057704 | 2/2002 |
| JP | 2002/157949 | 5/2002 |
| JP | 2003/169093 | 6/2003 |
| JP | 2005/184709 | 7/2005 |
| JP | 2005/236909 | 9/2005 |
| JP | 2007/005160 | 1/2007 |
| JP | 2007/189476 | 7/2007 |
| JP | 5318875 | 10/2013 |
| WO | WO 2009/034450 | 3/2009 |

OTHER PUBLICATIONS

Written Opinion corresponding to co-pending International Patent Application Serial No. PCT/IB2008/002365, dated Jan. 7, 2009, 5 pages.
Office Action corresponding to co-pending Japanese Patent Application No. 2010-524592, dated Feb. 27, 2013, 2 pages.
European Search Report, Application No. 08807052.9-1862, dated Jun. 21, 2013, 6 pages.
Office Action (w/ English translation) corresponding to co-pending Japanese Patent Application No. 2013-141559, dated Jun. 20, 2014, 5 pages.
Budruk, et al.; "PCI Express System Architecture"; Mindshare Inc.; 2004; ISBN 0-321-15630-7.

* cited by examiner

SYSTEM FOR TESTING ETHERNET PATHS AND LINKS WITHOUT IMPACTING NON-TEST TRAFFIC

CROSS-REFERENCE TO RELATED APPLICATION

This application is a continuation of U.S. patent application Ser. No. 14/446,708, filed Jul. 30, 2014, now allowed, which is a continuation of and claims priority to U.S. patent application Ser. No. 13/293,199, filed Nov. 10, 2011, now U.S. Pat. No. 8,824,312, which is a continuation of and claims priority to U.S. patent application Ser. No. 12/209,345, filed Sep. 12, 2008, now U.S. Pat. No. 8,139,494, which claims the benefit of U.S. Provisional Patent Application No. 60/993,622, filed Sep. 13, 2007, each of which is incorporated herein by reference in its entirety.

FIELD OF THE INVENTION

This invention relates generally to testing of Ethernet systems, and, more particularly, to systems for testing Ethernet paths and links without impacting non-test traffic.

BACKGROUND OF THE INVENTION

As depicted in FIG. 1, an Ethernet link 11 is a connection between two adjacent Ethernet devices 10A or 10B, while an Ethernet path 13, as depicted in FIG. 2, is a connection between two Ethernet devices 10A or 10B via a network 12 composed of multiples links, which may or may not be using Ethernet. The Ethernet device 10A, 10B, may be a network element device, such as a router, a switch, etc. or could be a simpler device, such as a personal computer (PC) or other terminal device. In case of a network element device, the Ethernet traffic may originate from or be destined for the device itself or from other devices behind it. The Ethernet link 11 and the Ethernet path 13 can be called an Ethernet circuit. The testing of an Ethernet circuit includes transmitting test traffic from one location toward an Ethernet device 10A or 10B. The test location may be anywhere on the Ethernet circuit. Test traffic reception processing, which may include validation, counting, bandwidth determination, etc., is not necessary, albeit useful, for the purpose of this invention.

The test traffic uses specified attributes (e.g., Ethernet ethertype, data payload, priority parameters, IP or MAC addresses, packet size, etc.) and specified transmission characteristics (such as bandwidth, burst size, test duration, etc.). The goal of the testing is to verify the ability of the Ethernet link 11 or path 13 to successfully convey Ethernet frames from one device 10A or 10B to another Ethernet device 10B or 10A under the specified conditions (packet attributes and transmissions characteristics). The traffic attributes or transmission characteristics used for a given test session may be set to any desired value as necessary but the operation of this invention does not depend on any setting. The Ethernet link 11 or path 13 is said to be in-use or in-service when traffic other than the test traffic is present on the said Ethernet link 11 or path 13 at the location where test traffic is transmitted.

SUMMARY OF THE INVENTION

Aspects disclosed herein relate to the testing of an Ethernet link 11 or Ethernet path 13, while it is being used by non-test traffic. In a typical test scenario, not using this invention, the non-test traffic is interrupted so that the validity of the test is not impaired. As a result, such a test is only performed at the installation time of the Ethernet link 11 or path 13 or when the Ethernet circuit is not in use or during non-normal business hours (night, week-ends, etc.). It is, however, desirable to be able to perform a test while non-test traffic is present, because problems (to be detected by the test) usually occur at the time of normal operation of the Ethernet circuit. But the test should be conducted in such a way that the normal non-test traffic is not affected. This invention relates to the methods and techniques used to perform a test while not impairing or impacting the normal operation of the non-test traffic. Impact or impairment occurs when non-test traffic is either excessively delayed or prevented from being delivered from one Ethernet device 10A or 10B to the other Ethernet device 10B or 10A due to the presence of test traffic. It is possible to execute a test, with non-test traffic present, without the use of this invention however some of the non-test traffic may either be dropped or excessively delayed.

BRIEF DESCRIPTION OF THE DRAWINGS

The invention will be better understood from the following description of preferred embodiments together with reference to the accompanying drawings, in which.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 3:
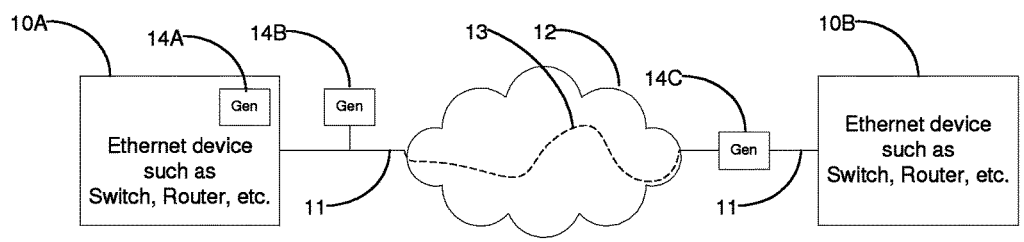
FIG. 3 is a functional block diagram of a test traffic generator in an Ethernet network comprising Ethernet links, an Ethernet path, and Ethernet devices.
Figure 4:
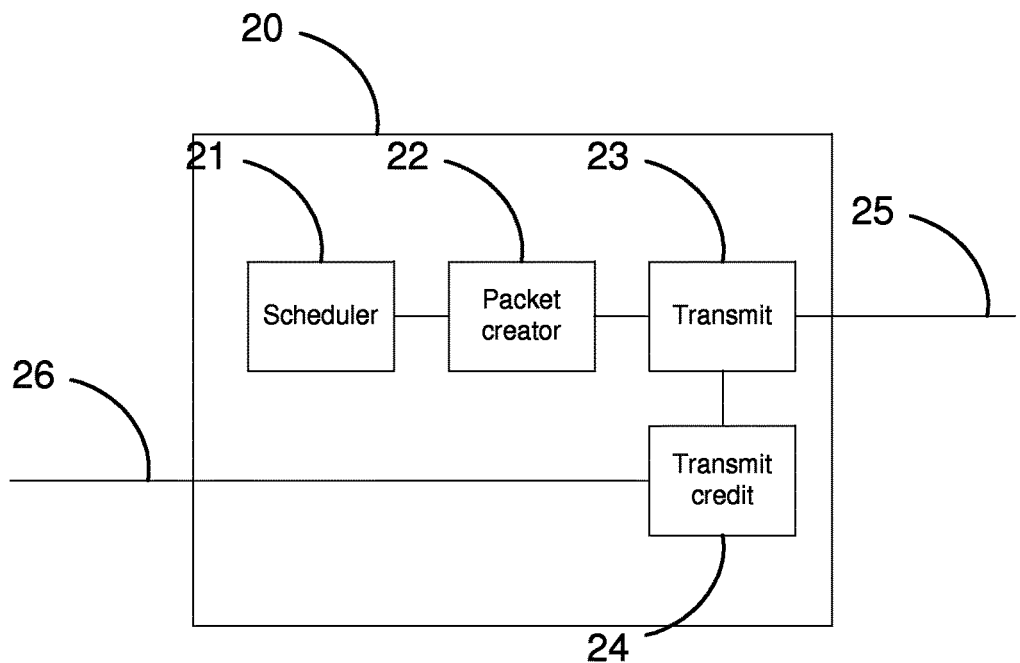
FIG. 4 is a functional block diagram of a transmit generator and its functional blocks including a transmit block coupled to a transmit credit block.
Figure 5:
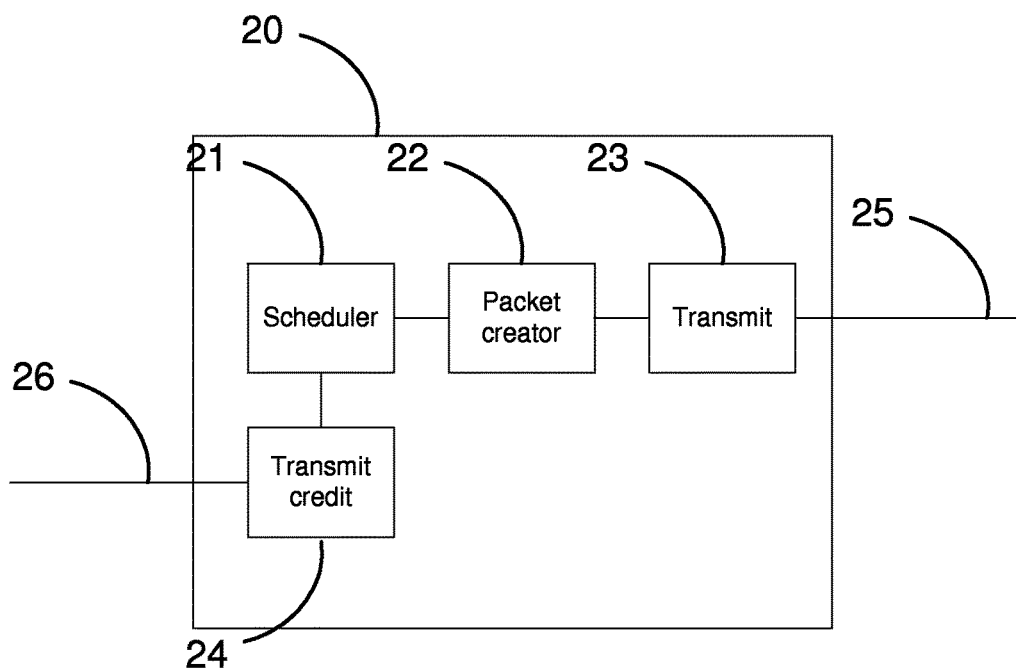
FIG. 5 is a functional block diagram of a transmit generator and its functional blocks like those shown in FIG. 4 except that the transmit credit block is responsive to a scheduler.

An embodiment of the invention includes the test traffic generator 14A, 14B, or 14C of FIGS. 3-5, which dynamically adapts its transmission characteristics in such a way as to not impair or impact the non-test traffic. Non-test traffic transmission characteristics (bandwidth, burst size, duration, etc.) may be bound by a bandwidth profile of some sort or may only be limited by the physical characteristics of the Ethernet medium (link speed, etc.).

Figure 1:
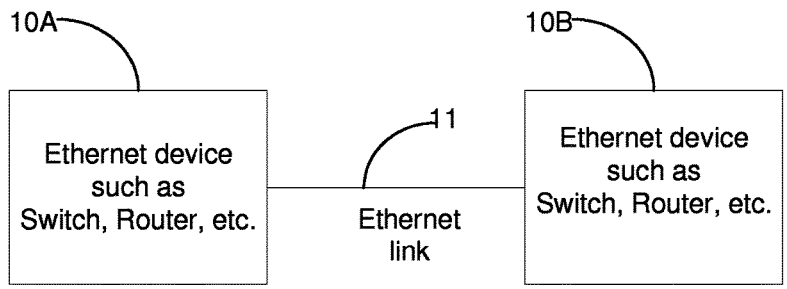
FIG. 1 is a function block diagram of two Ethernet devices connected via an Ethernet link.
Figure 2:
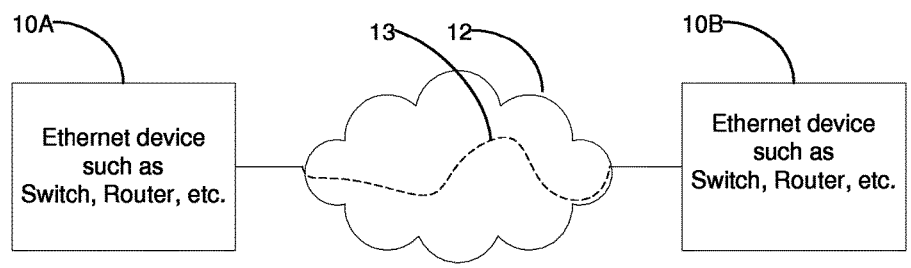
FIG. 2 is a functional block diagram of an Ethernet path between two Ethernet devices.

The dynamic test traffic generator 14A may be embedded in an Ethernet device 10A or 10B, or it may be located adjacent to the Ethernet link 11 as a generator 14B or it may be located in-line of the Ethernet link 11 as a generator 14C. In the case of generator 14C, there are at least two Ethernet ports that carry non-test traffic. Generator 14C must therefore forward non-test traffic between its ports. This function does not relate to the operation of this invention. In all cases, the information about the amount of non-test traffic flowing in the same direction as the test traffic is made available to the dynamic test traffic generator 14A, 14B, 14C. As an example, if the test traffic generator 14B sends test traffic toward the Ethernet device 10B, the information about the amount of non-test traffic flowing from Ethernet device 10A toward the Ethernet device 10B is made available to the generator 14B. The Ethernet path 13 and the network 12 may or may not be present. If the network 12 and the Ethernet path 13 are not present, the two Ethernet links 11 are connected together and form a single Ethernet link (as in FIG. 1).

The transmit generator 20 of FIG. 4 includes multiple functional building blocks, such as a scheduler 21, a packet creator 22, a transmit block 23 and a transmit credit block 24. Other functional building blocks not related to this invention may be included but are not illustrated. The scheduler 21 determines when a new test packet needs to be generated. It instructs the packet creator 22, which builds a valid test packet and sends it to the transmit block 23. The function of the transmit block 23 depends on where the traffic generator 20 is located. In the case of the traffic generator 14A, embedded in Ethernet device 10A, the function of the transmit block 23 is to sending the generated traffic to other functions within Ethernet device 10A. The exact scope and operation of these other functions do not relate to this invention. In the case of the traffic generator 14C, the function of the transmit block 23 is to send the generated traffic to other functions within the device. These other functions do not relate to the operation of this invention. In the case of the traffic generator 14B, the transmit block 23 includes an Ethernet port and is responsible for sending the Ethernet test packet on the Ethernet link 25 attached to it. Two different preferred embodiments are illustrated in FIGS. 4 and 5.

In the case of FIG. 4, the transmit block 23 queries the transmit credit block 24 and transmits a test packet if sufficient credits are available. Credits represent the number of bytes to transmit. Headers, preamble and other Ethernet frame fields, such as the inter-frame gap, may be included in the credit count depending on the mode of operation of the bandwidth associated with the test. As an example, a layer 2 test includes at least Ethernet headers but not the inter-packet gap. If a transmission occurs, the appropriate amount of credit is debited from the transmit credit block 24. If there is not enough transmit credit available, the transmission is delayed until enough credit is available. The information about the amount of non-test traffic is provided to the transmit credit block 24 via line 26. The method by which this information is made available to block 24 is not relevant to the operation of this invention. Credits are removed from the transmit credit block 24 for each non-test packet. This effectively reduces the amount of credit available to allow transmission of test traffic. The credit total may become negative, due to excessive non-test traffic. This will further delay the transmission of test traffic because more credits will need to be added before enough credit is available to start the transmission of a test packet. Transmission credits are added to the transmit credit block 24 using methods and techniques that are not pertinent to this invention.

In the case of FIG. 5, the scheduler 21 queries the transmit credit block 24 and only sends a request to the packet creator 22 if sufficient credits are available. Credits represent the number of bytes to transmit. Headers, preamble and other Ethernet frame fields, such as the inter-packet gap, may be included in the credit count depending on the mode of operation of the bandwidth associated with the test. As an example, a layer 2 test would include at least Ethernet headers but not the inter-frame gap. If a request occurs, the appropriate amount of credit is debited from the transmit credit block 24. If not enough transmit credit is available, the request is delayed until enough credit is available. The information about the amount of non-test traffic is provided to the transmit credit block 24 via the line 26. The method by which this information is made available to block 24 is not relevant to the operation of this invention. Credits are removed from the transmit credit block 24 for each non-test packet. This effectively reduces the amount of credit available to allow transmission of test traffic. The credit total may become negative, due to excessive non-test traffic. This will further delay the transmission of test traffic because more credits will need to be added before enough credit is available to start the transmission of a test packet. Transmission credits are added to the transmit credit block 24 using methods and techniques that are not pertinent to this invention.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A system for testing Ethernet paths in a network without impacting non-test traffic, comprising:
    at least one pair of Ethernet devices coupled to opposite ends of an Ethernet path for transmitting non-test packets on said Ethernet;
    at least one test packet generator coupled to said Ethernet path for transmitting test packets to test the transmission characteristics of said Ethernet path, said test packet generator comprising:
       a transmit credit block for storing an amount of credits representing a number of bytes that are available to transmit to be within a predetermined bandwidth limit;
       a scheduler responsive to said transmit credit block to determine when one or more new test packet is to be created, and
       a packet creator responsive to a request sent by said scheduler to build one or more new test packet to be transmitted on said Ethernet path.

2. The system of claim 1, wherein the scheduler queries the transmit credit block to determine whether sufficient credits are available from the transmit credit block to transmit the test packet.

3. The system of claim 1, wherein credits are decremented by said transmit credit block each time a non-test packet is transmitted on the Ethernet path.

4. The system of claim 1, wherein credits are decremented by said transmit credit block each time a test packet is transmitted on the Ethernet path.

5. The system of claim 2, wherein the credits are incremented periodically.

6. The system of claim 1, wherein the test packet generator includes an Ethernet port, and wherein the test packet generator is connected to the Ethernet link via the Ethernet port.

7. A method for testing Ethernet paths in a network without impacting non-test traffic, comprising:
    transmitting non-test packets on said Ethernet path between at least one pair of Ethernet devices coupled to opposite ends of said Ethernet path;

storing an amount of credits representing a number of bytes that are available to transmit;

decrementing the amount of credits each time said non-test packet or a test packet is transmitted on the Ethernet path;

scheduling the creation of at least one test packet when said amount of credit is greater than the number of bytes in the at least one test packet;

transmitting the created at least one test packet on the Ethernet path, and incrementing the amount of credits periodically.

8. A method for testing Ethernet paths in a network without impacting non-test traffic, comprising:

transmitting non-test packets on said Ethernet path between at least one pair of Ethernet devices coupled to opposite ends of said Ethernet path;

scheduling the creation of at least one test packet;

storing an amount of credits representing a number of bytes that are available to transmit;

transmitting the created at least one test packet on the Ethernet path when said amount of credit is greater than the number of bytes in the at least one test packet;

decrementing the amount of credits each time said non-test packet or a test packet is transmitted on the Ethernet path, and incrementing the amount of credits periodically.

* * * * *